UNITED STATES PATENT OFFICE.

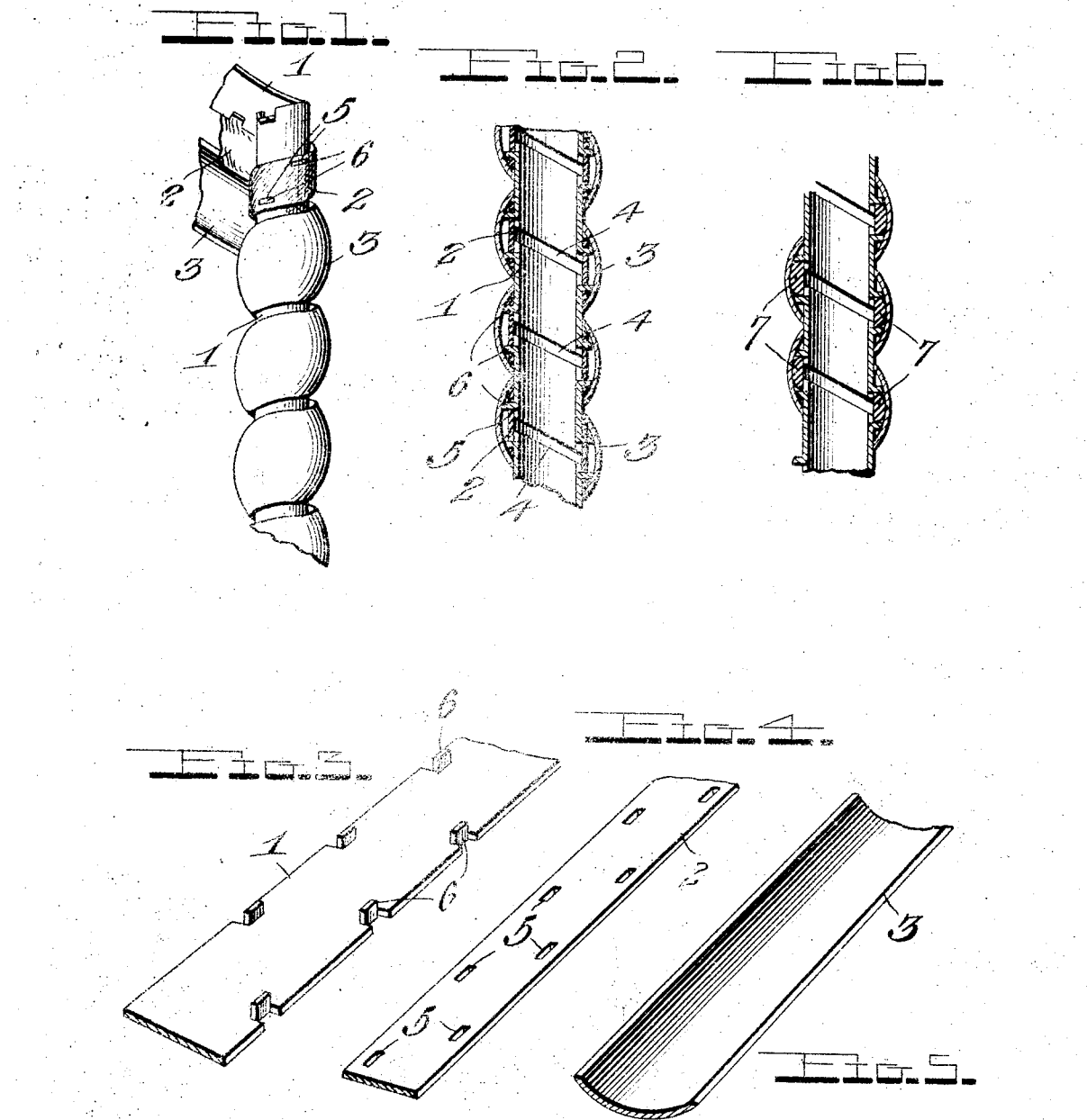

ULYSSES S. ARMSTRONG, OF NEW KENSINGTON, PENNSYLVANIA.

FLEXIBLE CONDUIT.

998,827. Specification of Letters Patent. Patented July 25, 1911.

Application filed August 8, 1910. Serial No. 576,155.

*To all whom it may concern:*

Be it known that I, ULYSSES S. ARMSTRONG, a citizen of the United States, residing at New Kensington, in the county of Westmoreland and State of Pennsylvania, have invented certain new and useful Improvements in Flexible Conduits; and I do declare the following to be a full, clear, and exact description of the invention, such as will enable others skilled in the art to which it appertains to make and use the same.

My invention relates to improvements in flexible conduits and more particularly to flexible steel tubing for electrical conductors and for analogous conduit purposes.

The principal object of this invention is to provide a flexible metal tubing or conduit having an interior free from concave surfaces and projections so that wires or conductors may be easily fished or placed in the conduit at a very small expense.

Another object of the invention is to provide a flexible conduit of this character having improved means whereby the different strips or layers of which it is composed will be interlocked or held in engagement and prevented from separating when the conduit is flexed or when there is longitudinal strain on the conduit.

With the above and other objects in view the invention resides in the combination and arrangement of parts and details of construction hereinafter fully described and claimed and illustrated in the accompanying drawing in which:

Figure 1 is a side elevation of a portion of a flexible conduit embodying my invention. Fig. 2 is a longitudinal section through the same. Figs. 3, 4 and 5 are detail perspective views of the three strips or layers composing the tubing or conduit shown in Figs. 1 and 2. Fig. 6 is a detail longitudinal section through a slightly modified form of the invention.

In the preferred embodiment of my invention which I have illustrated in Figs. 1 to 5 inclusive, the conduit is composed of three spirally twisted or coiled strips 1, 2 and 3 arranged so that they overlap. The inner strip or layer 1 is composed of a flat strip of steel or other suitable material bent into spiral form so that there are slight spaces between its coils as shown in Fig. 2. By making this inner member 1 from a flat strip it will be noted that the interior of the conduit will be free from concave recesses or depressions and inwardly extending projections, commonly found in conduits of this character now on the market and consequently electrical wires or conductors can be quickly and easily inserted through the conduit. The intermediate strip 2 may be of fiber or any other material which will permit said strip to serve as a gasket and also, if desired, as a locking member. As illustrated in Figs. 1 and 2 the strip or member 2 is made of flat material and spirally twisted so as to extend across the spaces 4 between the coils of the strip or member 1. To permit this strip or gasket 2 to serve as a locking member it is formed at intervals along its edges with openings 5 adapted to receive tongues 6 projecting outward from the strip 1. By interlocking the strips or members 1 and 2 in this manner it will be seen that the device will be greatly strengthened and prevented from being pulled open when there is any strain in a longitudinal direction upon it, and at the same time the flexibility of the conduit is not in any way impaired. The outer strip or member 3 is made from a strip of steel or other metal of semi-oval or concave shape in cross section and it is adapted to overlap the gasket or strip 2 and consequently the spaces 4 between the coils of the inner strip or layer 1.

The concave shape of the outer strip or member 3 is such that it not only protects the gasket 2 but also serves the additional purpose of a locking member. Since the projections or fasteners 6 project into engagement with the concave inner face of the strip 3 they prevent the longitudinal separation of the coils of the strip 1. In this connection it will be noted that the gasket or intermediate strip 2 may be omitted entirely and the locking tongues or projections 4 made to co-act with the inner concave surface of the outer strip 3. It will be further noted that, if desired, the locking tongues 6 may co-act or engage with the concave inner surface of the strip 3 and a round or oval shape gasket 7 may be arranged over the spaces between the coils of the strip 1 as shown in Fig. 6 of the drawing. On referring to this figure it will be observed that the gasket 7 is arranged between the tongues or projections 6 but is not slotted or recessed for engagement with such projections and consequently it serves merely as a gasket and not as a combined gasket and locking member as in the form of the invention first described.

The strips or layers of the conduit may be of the material as above noted although the inner and outer strips are preferably formed from steel or other metal and when so formed they are preferably galvanized, tinned, or lead coated.

From the foregoing it will be noted that my invention provides an exceedingly simple and practical conduit or tubing having an unobstructed bore or race-way through which electric wires or conductors may be easily passed, and while the invention has been particularly shown and described as embodied in a tubular conduit, I wish it understood that it may be used as an armour covering for electric wires. It will be further noted that the peculiar construction of the device renders the conduit or covering exceedingly strong without detracting from its flexibility and that when longitudinal strain is placed upon the device there will be no danger of the layers being pulled apart.

I claim:

A device of the character set forth comprising inner and outer spirally twisted strips, the inner strip being formed from flat material and the outer strip being formed from material of concave shape in cross section and being arranged to extend over the spaces of the coils of the inner strip, locking tongues struck up from the coils of the inner strip and adapted to engage the concave inner faces of the coils of the outer strip, and an intermediate spirally coiled gasket strip arranged within the outer strip and extending over the space of the coils of the inner strip, said gasket being formed with slots to receive said tongues whereby to serve to lock the adjacent coils of the inner strip.

In testimony whereof I have hereunto set my hand in presence of two subscribing witnesses.

ULYSSES S. ARMSTRONG.

Witnesses:
B. R. KLINE,
H. S. MILLER.